United States Patent
Noda

(10) Patent No.: US 9,363,668 B2
(45) Date of Patent: Jun. 7, 2016

(54) SENSOR NETWORK, SENSOR MANAGEMENT SERVER, KEY UPDATING METHOD AND KEY UPDATING PROGRAM

(71) Applicant: NEC Corporation, Tokyo (JP)

(72) Inventor: Jun Noda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 14/377,886

(22) PCT Filed: Jan. 30, 2013

(86) PCT No.: PCT/JP2013/052041
§ 371 (c)(1),
(2) Date: Aug. 11, 2014

(87) PCT Pub. No.: WO2013/118621
PCT Pub. Date: Aug. 15, 2013

(65) Prior Publication Data
US 2015/0030158 A1    Jan. 29, 2015

(30) Foreign Application Priority Data
Feb. 9, 2012  (JP) .................................. 2012-025916

(51) Int. Cl.
H04L 29/06     (2006.01)
H04W 12/04    (2009.01)
(Continued)

(52) U.S. Cl.
CPC .............. *H04W 12/04* (2013.01); *H04L 9/083* (2013.01); *H04L 9/0891* (2013.01); *H04L 9/14* (2013.01); *H04L 2209/24* (2013.01)

(58) Field of Classification Search
CPC ..... H04L 9/083; H04L 9/0816; H04L 9/0891; H04W 12/04; H04W 52/0216
USPC ....................................................... 380/270
See application file for complete search history.

(56) References Cited

U.S. PATENT DOCUMENTS 7,024,553 B1 * 4/2006 Morimoto ............... H04L 9/083
                                                            380/273
7,882,132 B2 * 2/2011 Ghatare ............ G06F 17/30569
                                                            707/782
(Continued)

FOREIGN PATENT DOCUMENTS

JP     11-196801      7/1999
JP     2002-135318    5/2002
(Continued)

OTHER PUBLICATIONS

Setia, Sanjeev, Sencun Zhu, and Sushil Jajodia. "A scalable and reliable key distribution protocol for multicast group rekeying." Virginia, USA: Department of Information and Software Engineering, George Mason University (2002).*

(Continued)

*Primary Examiner* — Syed Zaidi
(74) *Attorney, Agent, or Firm* — Young & Thompson

(57) ABSTRACT

A sensor network includes a sensor management server which is mutually connected with many sensor terminals. The sensor management server includes: a key delivery module for transmitting a key update message to the respective sensor terminals; a communication volume detection module for detecting a communication volume used for transmitting the key update message; and a multiplicity determination module for specifying a numerical value as a multiplicity, which represents the lower limit number of key update messages transmitted to the respective sensor terminals, according to the detected communication volume. The multiplicity determination module specifies the multiplicity such that the communication volume for transmitting or retransmitting the key update message takes the minimum value, and the key delivery module transmits the key update message by using the minimum communication volume that corresponds to the specified multiplicity.

11 Claims, 11 Drawing Sheets

(51) Int. Cl.
*H04L 9/14* (2006.01)
*H04L 9/08* (2006.01)

(56) References Cited

U.S. PATENT DOCUMENTS

| | | | |
|---|---|---|---|
| 8,903,096 B2* | 12/2014 | Chittigala | H04L 9/0825 380/255 |
| 2007/0078817 A1 | 4/2007 | Girao et al. | |
| 2013/0061037 A1* | 3/2013 | Zhang | H04L 63/0435 713/150 |
| 2013/0077779 A1* | 3/2013 | Batra | H04W 52/0225 380/31 |

FOREIGN PATENT DOCUMENTS

| | | |
|---|---|---|
| JP | 2006-157896 | 6/2006 |
| JP | 2009-010745 | 1/2009 |
| JP | 2010-524413 | 7/2010 |

OTHER PUBLICATIONS

International Search Report PCT/JP2013/052041 dated Apr. 9, 2013.

B. Clifford Neuman and Theodore Ts'o, "Kerberos: An Authentication Service for Computer Networks", IEEE Communications Magazine, vol. 32, No. 9, pp. 33-38, 1994.

* cited by examiner

SENSOR NETWORK, SENSOR MANAGEMENT SERVER, KEY UPDATING METHOD AND KEY UPDATING PROGRAM

TECHNICAL FIELD

The present invention relates to a sensor network, a sensor management server, a key updating method, and a key updating program. More specifically, the present invention relates to a sensor network and the like capable of suppressing the communication volume and efficiently delivering an encryption key to each sensor terminal.

BACKGROUND ART

A sensor network is a technique with which a large number of sensor terminals including sensors (e.g., for sensing temperature, atmospheric pressure, oscillation, acceleration, position, video, audio, radio wave, and the like) are put into a network and the state of a specific range is to be judged comprehensively based on the information from each of the sensors. It is expected to be able to apply the sensor network in various fields.

FIG. 10 is an explanatory chart showing the outline of the structure of a typical sensor network 901. The sensor network 901 is constituted with; a large number of sensor terminals 920a, 920b, - - - (generally referred to as sensor terminals 920) disposed within living environments; and a sensor management server 910 which receives information from those sensor terminals 920. Normally, the sensor management server 910 and the sensor terminals 920 are mutually connected via wireless communication.

The sensor network 910 needs to form a network by disposing an enormous number of sensor terminals 920 within living environments, and information must not leak to devices other than the sensor network. Thus, the sensor management server 910 transmits an encryption key 930 to each of the sensor terminals 920, encrypts the information collected by the own sensor provided thereto by the encryption key 930, and transmits it to the sensor management server 910.

However, each of the sensor terminals 920 is extremely small, so that ample calculator resources cannot be provided. Only a limited amount can be provided to each of the sensor terminals 920 regarding the calculation capacity of the processor, the storage capacity of the storage device, and the capacity of the battery. Thus, it is not possible to use a method which requires a large scale of calculations on the sensor terminal 920 side when transmitting/receiving the encryption key 930. Further, since the sensor management server 910 and the sensor terminals 920 communicate via wireless communication, it is difficult to transmit the encryption key 930 only to a specific terminal sensor.

Thus, it is common for the sensor network 901 to use a method which requires relatively a small calculation amount, such as a symmetric key (common key) encryption scheme, one-way hash function, or the like. For using the symmetric key encryption scheme, it is required to overcome the management regarding distribution and sharing of the key information that is the basis for the security of the encryption and authentication. In Non-Patent Documents 1 to 2, disclosed is an updating method of the encryption key 930 based on such symmetric key encryption scheme.

The technique disclosed in Non-Patent Document 1 is structured to hold the master key on one-on-one basis between each sensor terminal and the management server, and the management server encrypts an intrinsic key for each of the sensor terminals and distributes it individually by utilizing the master key. With this method, the number of keys to be updated and the number of communications required for updating the keys depend on the number of the sensor terminals. As described above, under the environment with a large number of sensor terminals, the communication volume required for distributing the keys also becomes tremendous.

Meanwhile, the technique disclosed in Non-Patent Document 2 generates a key an element key) for each attribute value such as the type and disposed place of each sensor terminal by paying an attention to the fact that the sensor terminal can be identified uniquely according to the combination of the attribute values. Further, arithmetic operations (concatenation, hash) are performed on the element key to generate the intrinsic key for each of the sensor terminals. Thereby, the number of the keys to be managed by the entire sensor network is reduced.

Update of the key provided to each of the sensor terminals is performed by repeatedly broadcasting a key update message that is generated by encrypting the information (salt) required for updating the key by using the element key related to the attribute value to a sensor terminal group which shares each attribute. With this method, the number of distribution times of the key update message becomes equivalent to the total number of attribute values. Under the environment with a great number of sensor terminals, the number of attributes is smaller than the number of sensor terminals. Thus, with the use of the method depicted in Non-Patent Document 2, the communication volume required for delivering the key update messages can be reduced greatly compared to the case of the method depicted in Non-Patent Document 1.

As other related techniques thereof, there are following technical documents. Among those, Patent Document 1 describes an autonomous distribution network of a lighting device. Patent Document 2 describes a technique which delivers an encryption key of a subject key encryption scheme securely, Patent Document 3 describes a data totalization method which encrypts and transfers data in a sensor network.

Patent Document 1: Japanese Unexamined Patent Publication 2002-135318
Patent Document 2: Japanese Unexamined Patent Publication Hei 11-196801
Patent Document 3: Japanese Patent Publication Application 2010-524413
Non-Patent Document 1: B. C. Neuman and Ts'o, Kerberos: "An authentication service for computer networks", IEEE Communications Magazine, Vol. 32, No, 9, pp. 33-38, 1994, Non-Patent Document A.: Jun Noda, Yuichi Kaji, Toshiyasu Nakao, "A Group Key Management Scheme for Sensor Nodes Belonging to Multiple Large-scale Groups", "Multimedia, Distributed, Cooperative and Mobile System" Information Processing Society of Japan, Journal 52(3), 2011 However, with the method depicted in Non-Patent Document 2, each sensor terminal normally has a plurality of attributes (e.g., the type of each terminal sensor, disposed place, and the like). Thus, multiple key update messages are delivered to a single sensor terminal. In the current Description, the lower limit value of the number of key update messages delivered to each sensor terminal is referred to as a multiplicity.

FIG. 11 is an explanatory chart showing an example of the relation between the communication volume and the multiplicity in a case where the technique depicted in Non-Patent Document 2 is applied to the sensor network 901 shown in FIG. 10. The relation shown in FIG. 11 is acquired empirically based on experiments done by the inventors. In a case where the multiplicity is large, the reception success rate is improved and it becomes robust for omission of key data. However, useless delivery is to occur when the communication environment is good. Inversely, when the multiplicity is small, the reception success rate is decreased and many retransmissions are to occur.

That is, the communication volume is increased whether the multiplicity is too large or too small. When the communication volume is increased, the power consumption of each terminal sensor is increased, which is particularly an issue for a sensor terminal that can carry only a small battery.

Non-Patent Document 1 and Patent Documents 1 to 3 do not disclose the technique that can overcome such issue. Non-Patent Document 1 is described above. Further, none of Patent Documents 1 to 3 is directed to decrease the communication volume when delivering the key update messages, and no technique that can be used for such object is disclosed therein.

An object of the present invention to provide a sensor network, a sensor management server, a key updating method, and a key updating program capable of efficiently delivering encryption keys to each sensor terminal by suppressing the communication volume.

DISCLOSURE OF THE INVENTION

In order to achieve the foregoing object, the sensor network according to the present invention is a sensor network including a large number of sensor terminals each storing an element key and a sensor management server connected mutually, in which the sensor management server transmits a key update message to each of the sensor terminals, and each of the sensor terminals updates the element key according to the received key update message and performs encrypted communication with the sensor management server by utilizing the element key, wherein: the sensor management server includes a key delivery module which transmits the key update message to each of the sensor terminals, a communication volume detection module which detects a communication volume when transmitting or retransmitting the key update message, and a multiplicity determination module which specifies a numerical value of the multiplicity that is the lower limit value of the number of the key update messages transmitted to each of the sensor terminals according to the detected communication volume; and the multiplicity determination module specifies the multiplicity with which the communication volume when transmitting or retransmitting the key update message becomes a minimum value, and the key delivery module transmits the key update message with a minimum communication volume that corresponds to the specified multiplicity.

In order to achieve the foregoing object, the sensor management server according to the present invention is a sensor management server connected mutually with a lame number of sensor terminals each storing an element key, which transmits a key update message for updating the element key to each of the sensor terminals and performs encrypted communication with each of the sensor terminals by utilizing the element key. The sensor management server includes: a key delivery module which transmits the key update message to each of the sensor terminals; a communication volume detection module which detects a communication volume when transmitting or retransmitting the key update message, and a multiplicity determination module which specifies a numerical value of the multiplicity that is a lower limit value of number of the key update messages transmitted to each of the sensor terminals according to the detected communication volume, wherein the multiplicity determination module specifies the multiplicity with which the communication volume when transmitting or retransmitting the key update message becomes a minimum value, and the key delivery module transmits the key update message according to a minimum communication volume that corresponds to the specified multiplicity.

In order to achieve the foregoing object, the key updating method according to the present invention is a key updating method used in a sensor network including a large number of sensor terminals each storing an element key and a sensor management server connected mutually, in which the sensor management server transmits a key update message to each of the sensor terminals, and each of the sensor terminals updates the element key according to the received key update message and performs encrypted communication with the sensor management server by utilizing the element key, wherein: a multiplicity determination module of the sensor management server initially sets a numerical value of a multiplicity that is a lower limit value of number of the key update messages transmitted to each of the sensor terminals; a key delivery module of the sensor management server transmits the key update message according to the set numerical value of the multiplicity; a communication volume detection module of the sensor management server detects a communication volume when transmitting or retransmitting the key update message; and the multiplicity determination module of the sensor management server specifies the numerical value of the multiplicity when transmitting the key update message next time according to the detected communication volume.

In order to achieve the foregoing object, the key updating program according to the present invention is a key updating program used in a sensor network including a large number of sensor terminals each storing an element key and a sensor management server connected mutually, in which the sensor management server transmits a key update message to each of the sensor terminals, and each of the sensor terminals updates the element key according to the received key update message and performs encrypted communication with the sensor management server by utilizing the element key. The program causes a computer provided to the sensor management server to execute: a procedure for initially setting a numerical value of a multiplicity that is a lower limit value of number of the key update messages transmitted to each of the sensor terminals; a procedure for transmitting the key update message according to the set numerical value of the multiplicity; a procedure for detecting a communication volume when transmitting or retransmitting the key update message; and a procedure for specifying the numerical value of the multiplicity when transmitting the key update message next time according to the detected communication volume.

As described above, the present invention is structured to detect the communication volume and specify the multiplicity such that the communication volume becomes the minimum. Therefore, it is possible to control the multiplicity to take the optimum value. This makes it possible to provide the sensor network, the sensor management server, the key updating method, and the key updating program capable of efficiently delivering encryption keys to each sensor terminal by suppressing the communication volume.

BEST MODES FOR CARRYING OUT THE INVENTION

First Embodiment

Figure 1:
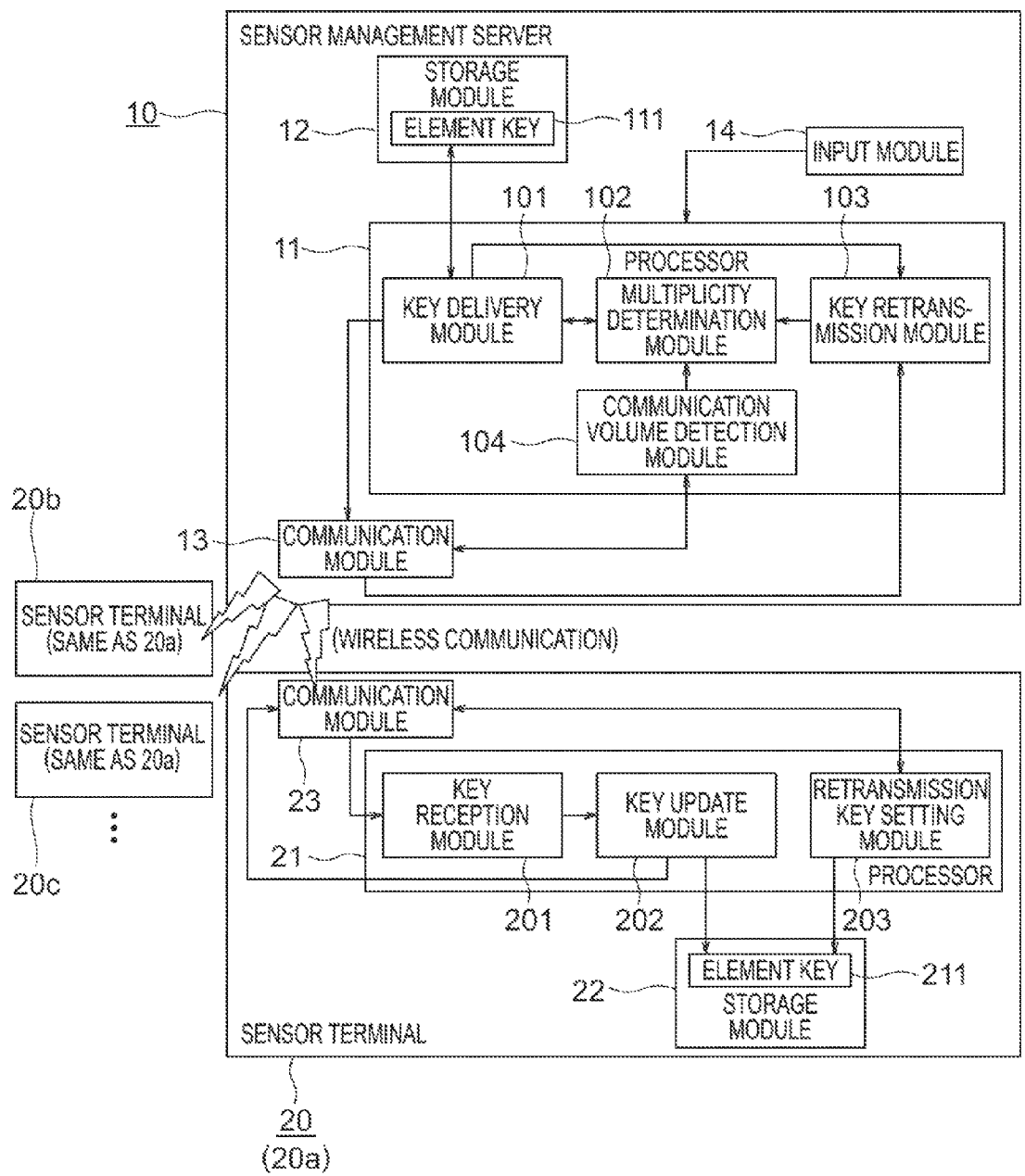
FIG. 1 is an explanatory chart showing the structure of a sensor network according to a first embodiment of the present invention.

Hereinafter, the structures of the embodiment of the present invention will be described by referring to accompanying drawing FIG. 1.

The basic contents of the embodiment will be described first, and more specific contents will be described thereafter.

A sensor network 1 according to the embodiment is a sensor network in which: a large number of sensor terminals 20 each having an element key stored therein and a sensor management server 10 are connected mutually; the sensor management server transmits a key update message to each of the sensor terminals; and each of the sensor terminals updates an element key 211 according to the received key update message and executes encrypted communication with the sensor management server by using the element key. The sensor management server 10 includes: a key delivery module 101 which transmits a key update message to each of the sensor terminals; a communication volume detection module 104 which detects the communication volume when transmitting or retransmitting the key update message; and a multiplicity determination module 102 which determines a numerical value of the multiplicity that is the lower limit value of the number of key update messages transmitted to each of the sensor terminals according to the detected communication volume. Further, the multiplicity determination module 102 specifies the multiplicity such that the communication volume when transmitting or retransmitting the key update message takes the minimum value, and the key delivery module 101 transmits the key update message with the minimum communication volume that corresponds to the specified multiplicity.

Further, the multiplicity determination module 102 of the sensor management server 10 sets the number of attributes of each of the sensor terminals as the initial value of the multiplicity and, thereafter, successively decreases the multiplicity until the communication volume when transmitting the key update message turns to increase from decrease.

Each of the sensor terminals 20 includes: a key reception module 201 which receives the ley update message; and a key update module 202 which updates the element key according to the information acquired by decrypting the received key update message. Further, each of the sensor terminals 20 includes a retransmission key setting module 203 which requests retransmission of the key update message when the key update message with which the element key can be updated cannot be received. The sensor management server 10 includes a key retransmission module 103 which transmits the information required for updating the element key in response to the retransmission request. The retransmission key setting module 203 of each of the sensor terminals 20 receives the transmitted information required for updating the element key and updates the element key based thereupon.

Further, the key delivery module 101 of the sensor management server 10 repeats the processing for selecting the sensor terminals corresponding to the specific attribute among each of the sensor terminals and transmitting the key update message to those sensor terminals until the multiplicity reaches the numerical value specified by the multiplicity determination module.

With the above-described structure, the sensor network 1 can efficiently deliver the encryption key to each of the sensor terminals by suppressing the communication volume. This will be described in more details hereinafter.

FIG. 1 is an explanatory chart showing the structure of the sensor network 1 according to the first embodiment of the present invention. The sensor network 1 is constituted by mutually connecting the sensor management server 10 to a large number of sensor terminals 20a, 20b, (generally referred to as the sensor terminals 20 hereinafter).

The sensor management server 10 includes the basic structures as a computer device. That is, the sensor management server 10 includes: a processor 11 as a main unit for operating a computer program; a storage module 12 which stores the program and data; a communication module 13 which executes wireless communication with each of the sensor terminals 20; and an input module 14 which accepts opera (commands inputted from the user.

The processor 11 of the sensor management server 10 functions as each of the key delivery module 101, the multiplicity determination module 102, the key retransmission module 103, and the communication volume detection module 104 through the operation of an encryption key update program. Further, an element key 111 is stored to the storage module 12 in advance.

Each of the sensor terminals 20 also includes the basic structures as a computer device even though the device scale is limited. That is, each of the sensor terminals 20 includes: a processor 21 as a main unit for operating the computer program; a storage module 22 which stores the program and data; and a communication module 23 which executes wireless communication with the sensor management server 10 and other sensor terminals 20.

The processor 21 of each of the sensor terminals 20 functions as each of the key reception module 201, the key update module 202, and the retransmission key setting module 203 through the operation of an encryption key update program. Further, an element key for each of the sensor terminals is stored to the storage module 22 in advance by the key update module 202 and the retransmission key setting module 203.

The key delivery module 101 of the sensor management server 10 transmits the key update message based on the element key 111 to each of the sensor terminals 20. The multiplicity determination module 102 determines the multiplicity at the time of the transmission. The key retransmission module 103 accepts the retransmission request from each of the sensor terminals 20, and retransmits the key update message in response to the request. The communication volume detection module 104 detects the communication volume generated according to the transmission and retransmission of the key update message from the communication module 13, and reports it to the multiplicity determination module 102.

The key reception module 201 of each of the sensor terminals 20 receives the key update message from the sensor management server 10. The key update module 202 updates the own element key 211 according to the received key update message. The retransmission key setting module 203 requests retransmission of the key update message to the key retransmission module 103 (by a request from the key reception module 201 and the key update module 202), when the element key 211 cannot be updated properly. The retransmission key setting module 203 further receives the information required for updating the element key retransmitted from the sensor management server 10 in response to the request, and updates the own element key 211 according to that.

It is assumed that each of the sensor terminals 20 is uniquely specified by a combination of the values of d pieces of attributes. A set of elements that are the sensor terminals 20 having the attribute value j of the attribute i is defined as a set G shown in Expression 1 below, and the element key 111 associated with the attribute value j of the attribute i (shared in G_(i, j)) is defined as the element key k_(i, j) shown in Expression 1 below, respectively.

Note here that a numerical value of A with a superscript B is expressed as A^B, and a numerical value of A with a subscript B is expressed as A_B respectively, in lines of the Description other than in numerical expressions. "Numerical value G with subscript letters i, j" and "numerical value k with subscript letters i, j" shown in Expression 1 below are expressed as "G_(i, j)" and "k_(i, j)", respectively in lines other than in numerical expressions.

$$\text{Set } G_{i,j}$$

$$\text{Element key } k_{i,j} \qquad \text{(Expression 1)}$$

Further, at the point of starting the management, each of the sensor terminals 20 also manages in advance the set of the currently valid element keys 211, information $\{K, t, SN\}$ regarding those, a set of the element keys 211 to become valid next, and information $\{K^q, t^q, SN^q\}$ regarding those, Note here that K shown in Expression 2 below is a set of all the own element keys 211, t is the use start time of the element key, and SN is a generation number of the element key.

$$K = \{K_{1,1j}, \text{---}, K_{d,dj}\} \qquad \text{(Expression 2)}$$

Further, the upper limit value a of the interval for updating the key is also defined in advance within the sensor network 1. The long-time use of a same subject key generates vulnerability since it extends the grace period for those who try to tap the communication when analyzing the key. Thus, it is necessary to set a in view of the tradeoff with the security.

K^q shown in Expression 3 below is a set of the element keys 211 to become valid next. In a case where the information of the keys to be valid, next has not been acquired (at the start of operation, etc.), each element of K^q has undef that shows undefined as the initial value. The initial value of t^q is defined as the time acquired by adding α to the use start time of the current element key 211. The initial value of SN^q is defined the value acquired by adding 1 to SN of the currently valid element key 211.

$$K^q = \{K^q_{1,1j}, \text{---}, K^q_{d,dj}\} \qquad \text{(Expression 3)}$$

Figure 2:
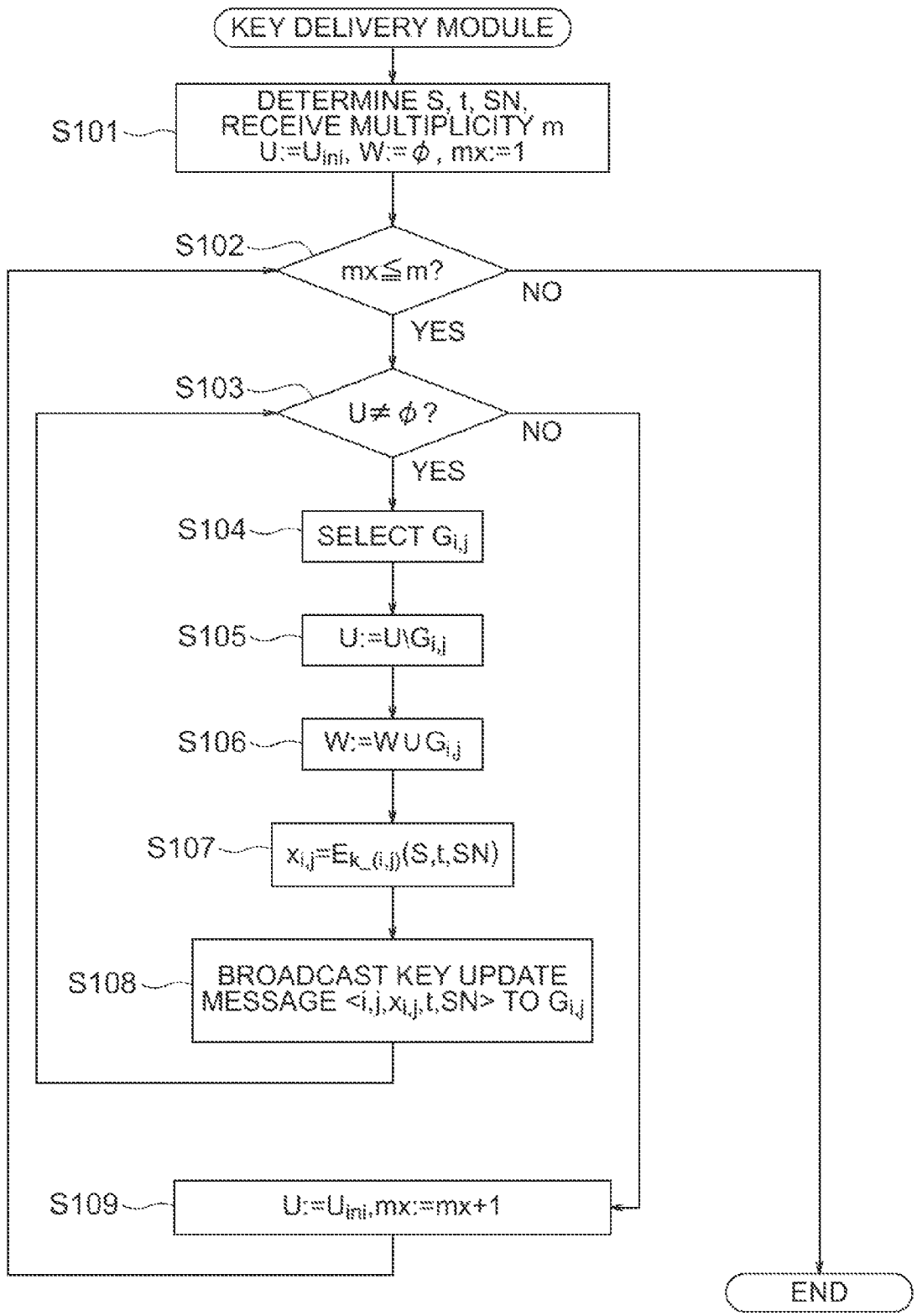
FIG. 2 is a flowchart showing operations executed by a key delivery module in a sensor management server shown in FIG. 1.

FIG. 2 is a flowchart showing the operations executed by the key delivery module 101 in the sensor management server 10 shown in FIG. 1. The key delivery module 101 first executes initial setting processing by the information inputted from the input module 14 prior to the update of the key (step S101).

In step S101, the salt S that is a random number, the start time t of the use of a new element key, and the generation number SN of the new element key are defined according to the input information, respectively. Further, the numerical value m for determining the multiplicity of key delivery is inputted from the multiplicity determination module 102. Furthermore, it is also defined that a set U having the sensor terminals as elements=a set Uini of all the sensor terminals whose element keys are updated, a collection W having sets of terminals that share the attribute=φ (an empty set), and variable mx for controlling the multiplicity when delivering the key update message=1, respectively.

Note here that arbitrary time until time acquired by adding α to the use start time of the currently valid element key may be defined as t. Further, k'_(i, j) shown in Expression 4 below is stored to the currently valid element key k as a new element key related to the generation number SN. Note that h(x) is an output of one-way hash function having x as the input, and x||y is a concatenation operator of the information x and y expressed with bits.

$$k'_{i,j} = h(S \| k_{ij}) \qquad \text{(Expression 4)}$$

Simultaneously, the salt S as the random number used for generating a new element key, the use start time t, and the information SN showing the generation are also inputted. Thus, those are stored as well.

Then, the processing of steps S103 to S108 is repeated until mx reaches the multiplicity m (step S102). First, it is checked whether or not U=φ (an empty set) is satisfied (step S103). When U=φ is not satisfied, a terminal set G_(i, j) having the maximum number of sensor terminals belonging thereto is selected among the terminal sets satisfying Expression 5 below (step S104).

$$G_{i,j} \cap U = \phi, G_{i,j} \cap W = \phi \qquad \text{(Expression 5)}$$

The sensor terminals included in j) selected in step S104 are excluded, from U (step S105), and this G_(i, j) is added to W (step S106). Then, x_(i, j) shown in Expression 6 below is calculated (step S107). Note here that Ex(y) shows the information acquired by encrypting data y by a symmetric key encryption algorithm by using the key x.

$$x_{i,j} = E_{ki,j}(S, t, SN) \qquad \text{(Expression 6)}$$

Further, the key update message constituted with <i, j, x_(i, j), t, SN> is broadcasted and transmitted towards the sensor terminals belonging to G (step S108), and the processing is returned to step S103. That is, the processing of steps S104 to S108 is to be repeated until U=(p becomes satisfied. When U=φ is satisfied, it means that the key update message containing x that can be decrypted at least once by the own element key is delivered to each of the sensor terminals. Thus, it is again returned to U=Uini and the value of mx is incremented (+1) (step S109), and the processing is returned to step S102. When mx has reached to the multiplicity m in step S102, the processing is ended.

Figure 3:
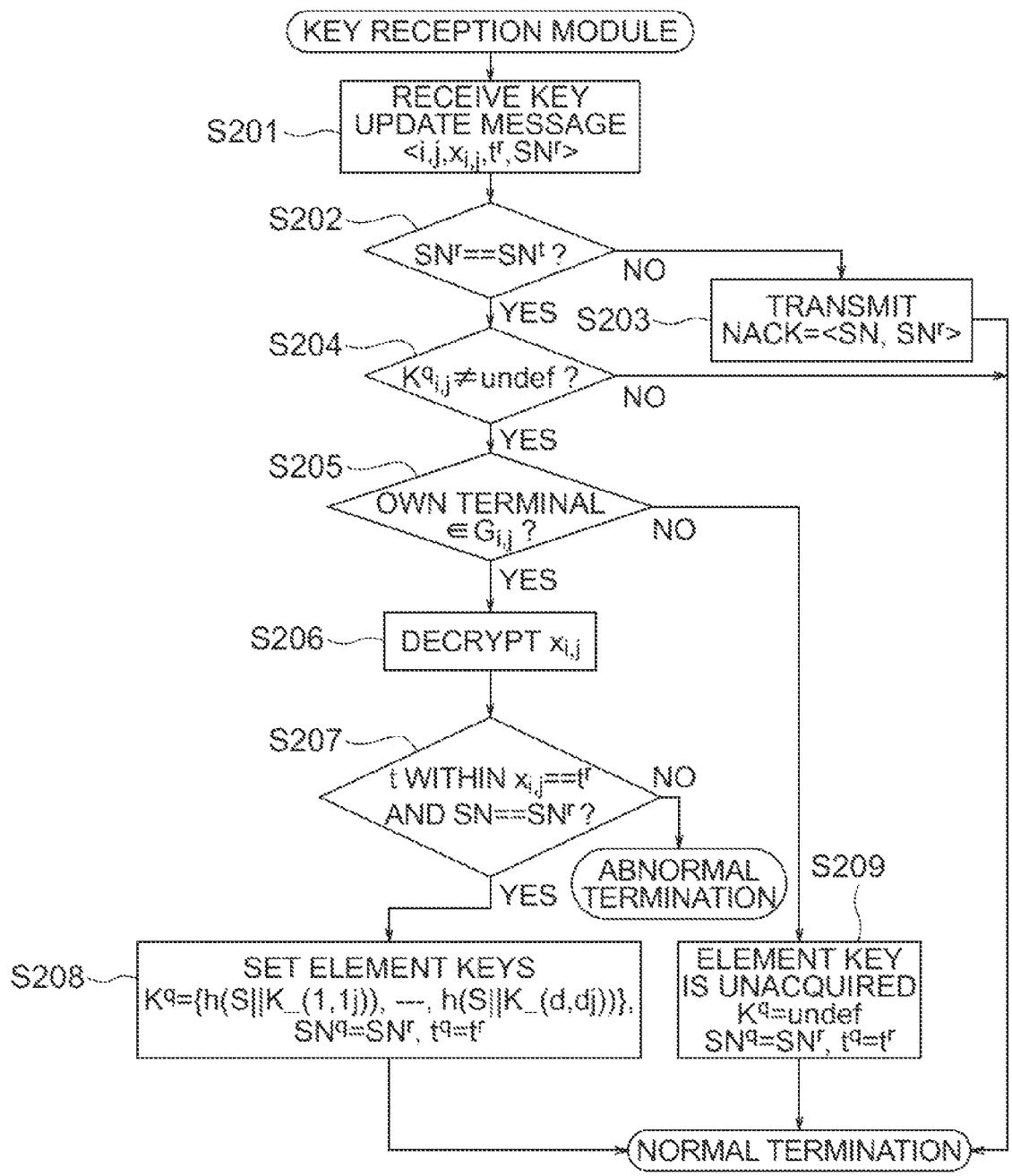
FIG. 3 is a flowchart showing operations executed by a key reception module in each sensor terminal shown in FIG. 1.

FIG. 3 is a flowchart showing the actions executed by the key reception module 201 in each of the sensor terminals 20 shown in FIG. 1. The key reception module 201 that has received the key update message constituted with <i, j, x_(i, j), t^r, SN^r> from the key delivery module 101 of the sensor management server 10 (step S201) first judges whether or not SN^q contained, in the own element key 211 and the received SN^r are equivalent (step S202).

When SN^q and SN^r are equivalent, it is judged that the keys of the current generation and the next generation are of the continuous generations and the processing is advanced to step S204 and thereafter. When SN^q and SN^r are not equivalent, it means that the key of the latest SN^r generation cannot be acquired. Thus, in that case, NACK=<SN, SN^r> is transmitted to the server via the retransmission key setting module 203 (step S203), and the processing is ended.

Note here that SN is the generation of the element key that is possessed, as currently valid by the sensor terminal that is the transmitter of NACK, SN^r is the generation of the key not possessed by the sensor terminal. Further, NACK is "Negative ACKnowledaement negative response)", which is a response indicating that the data cannot be received properly.

When SN^q and SN^r are equivalent, the key reception module 201 next judges whether or not K^q_(i, j)=undef (undefined) is satisfied (step S204). When K^q_(i, j)=undef is not satisfied, it means that the sensor terminal 20 has already received the key of the next generation. Thus, the processing is ended there properly. When K^q_(i, j) undef is satisfied, the processing is advanced to step S205 and thereafter for acquiring information regarding the key that has not been acquired.

Specifically, the module judges whether or not the module itself is included in G_(i, j) (step S205). When judged as included, the module decrypts j) and acquires S, t^r and SN^r (step S206), and judges whether or not t^r acquired as a result of the decryption and t^r within the received key update message <i, j, x_(i,j), t^r, SN^r> are equivalent and also judges whether or not SN^T acquired as a result of the decryption and SN^r within the received key update message <i, j, x_(i, j), t^r, SN^r> are equivalent (step S207). When judged as not equivalent, it is considered that there is alteration in the key data somewhere on the path and the processing is ended as abnormal termination.

When judged in step S207 that t^r and SN^r are equivalent, respectively, it is judged that there is no alteration in the key data. Thus, K^q shown in Expression 7 below is calculated and set as the element key 211 based on S acquired as a result of decryption and the currently valid key K (shown by Expression 2 described above). Further, t^r is set as t^q and SN^r as SN^q for each of the element keys 211 (step S208), and the processing is ended as normal termination.

$$K^q = \{h(S\|k_{i,lj}), \cdots, h(S\|k_{d,dj})\} \quad \text{(Expression 7)}$$

When judged in step S205 that the module itself is not included in G_(i, j), the received key update message is the key update message for another group. That is, x_(i, j) cannot be decrypted, so that K^q cannot be updated. However, it is possible to know the use start time of the next generation key by referring to t^r. Therefore, t^r is set as t^q and SN^r as SN^q for each of the element keys 211 (step S209), and the processing is ended as normal termination.

Figure 4:
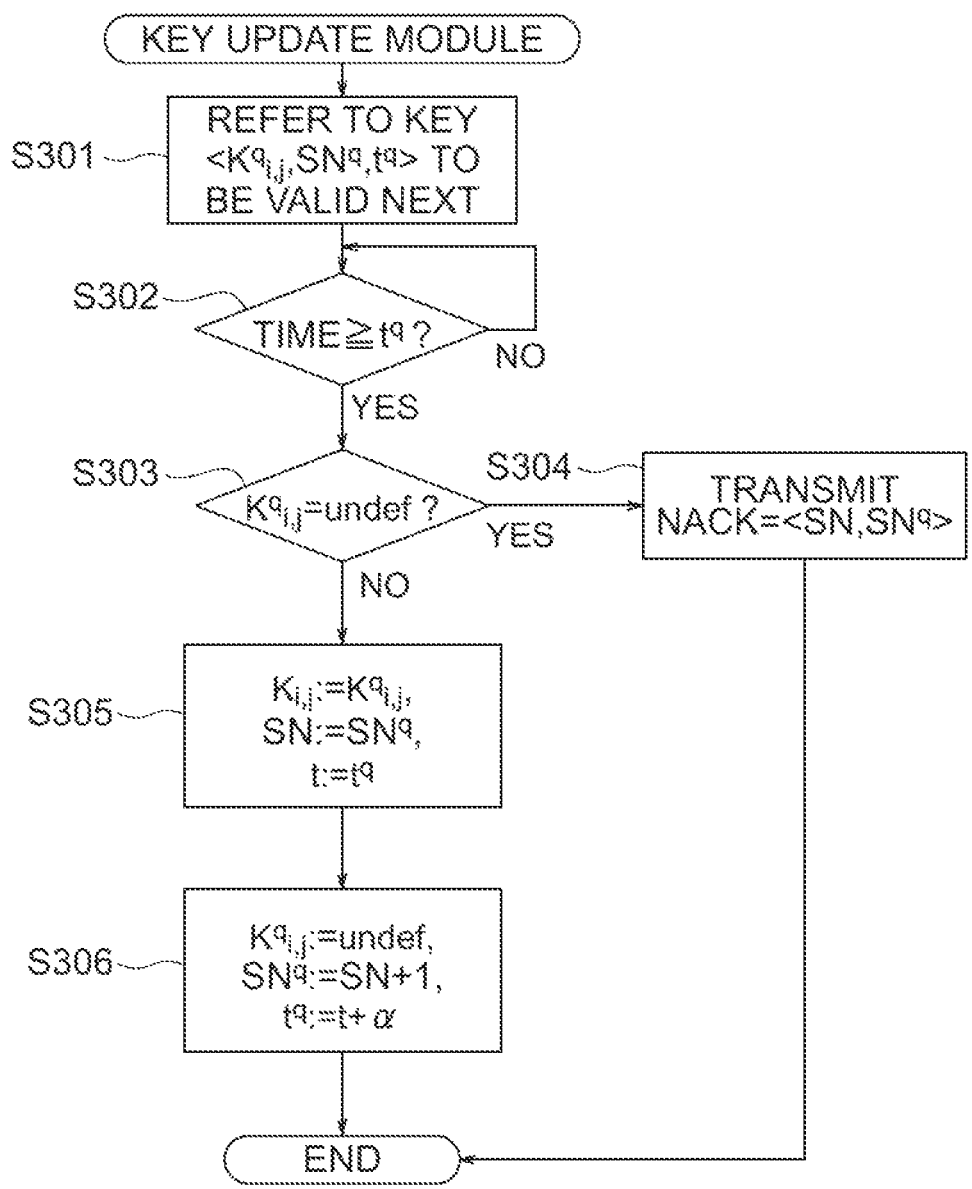
FIG. 4 is a flowchart showing operations executed by a key update module in each sensor terminal shown in FIG. 1.

FIG. 4 is a flowchart showing the operations executed by the key update module 202 in each of the sensor terminals 20 shown in FIG. 1. The key update module 202 first refers to the information {K^q, t^q, SN^q} regarding the key to become valid next managed by the key reception module 201 (step S301). Then, it is judged whether or not the current time t has reached the use start time t^q of the key to become valid next, i.e., whether or not t≥t^q is satisfied in each of the sensor terminals 20 (step S302). The current key is still valid when t<t^q is satisfied, so that judgment in step S302 is continued.

When t≥t^q is satisfied, the key update module 202 continuously judges whether or not the element of K^q satisfies K^q_(i, j)=undef (undefined), i.e., whether or not the next valid key is set (step S303). When K^q_(i, j)=undef is satisfied, the next key has not been acquired. Thus, NACK={SN, SN^q} is transmitted to the server via the retransmission key setting module 203 (step S304), and the processing is ended.

When K^q_(i, j)=undef is not satisfied, {K^q, SN^q} is set as the information {K, t, SN} regarding the currently valid key (step S305). Further, the information {K^q, t^q, SN^q} regarding the key to become valid next is initialized (step S306), and the processing is ended. That is, all the elements of K^q are set as undef, the time acquired by adding (the upper limit value of) the key update interval α to the use start time of the currently valid element key is set as t^q, and the value acquired by adding 1 to SN of the currently valid element key is set as SN^q, respectively.

Figure 5:
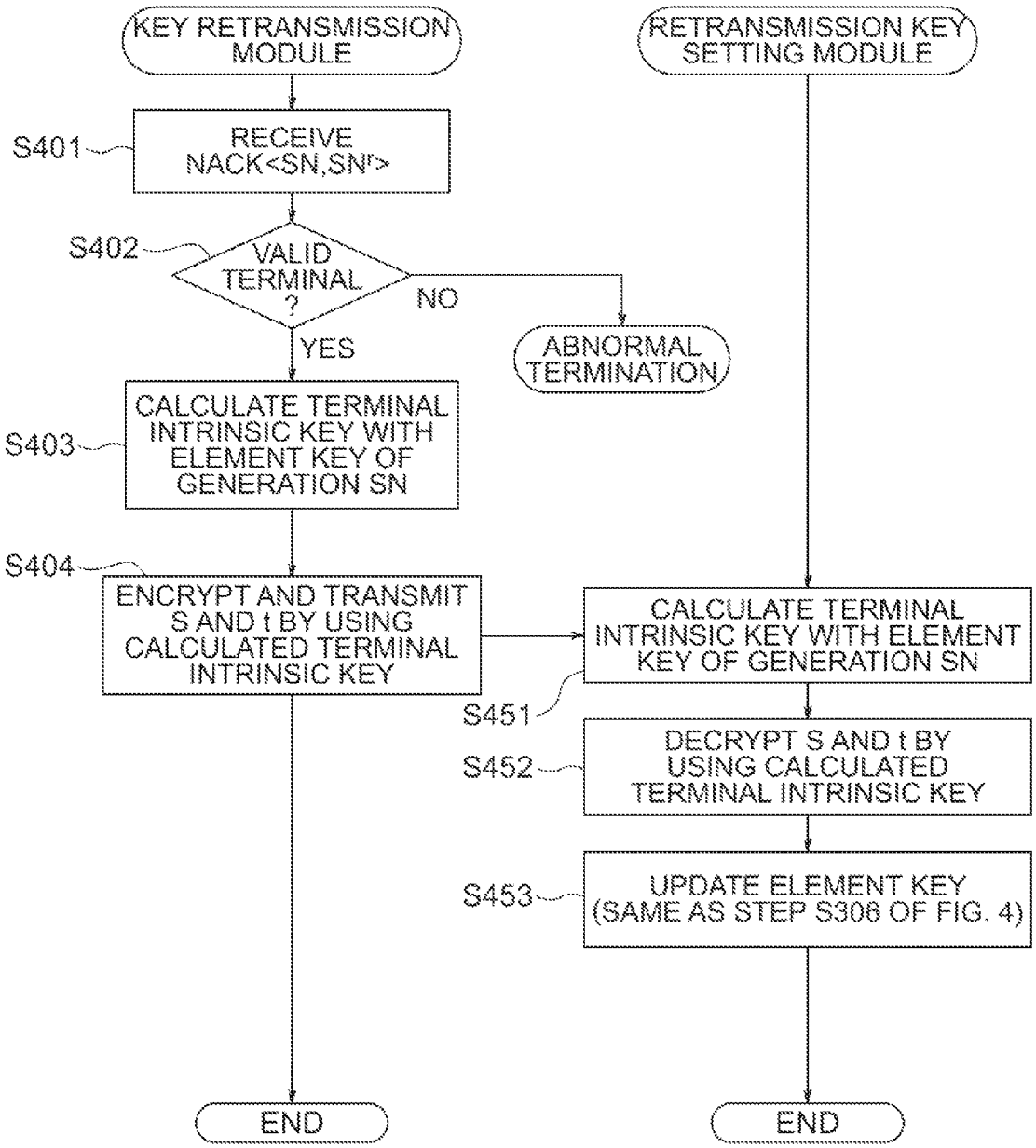
FIG. 5 is a flowchart showing operations executed by a retransmission key setting module of each sensor terminal and a key retransmission module of the sensor management server shown in FIG. 1.

FIG. 5 is a flowchart showing the operations executed by the retransmission key setting module 203 of each of the sensor terminals 20 shown in FIG. 1 and the key transmission module 103 of the sensor management server 10. When the key transmission module 103 of the sensor management server 10 receives NACK={SN, SN^r} from the key reception module 201 or the key update module 202 of each of the sensor terminals 20 (step S401), it is judged whether or not the sensor terminal 20 that is the transmitter of NACK is valid (step S402). When judged as invalid, the processing is ended as abnormal termination. When judged as valid, the processing is advanced to step S403.

When the sensor terminal 20 is valid, the key intrinsic to the transmitter sensor terminal is calculated by combining the element keys 111 of the generation number SN received in NACK (step S403), all the salts S required for sequentially calculating the element key of the generation SN^r from the element key of the generation SN are encrypted along with the use start time t of the element keys of each of the generations with the key intrinsic to the sensor terminal and are transmitted to the sensor terminal (step S404).

The retransmission key setting module 203 of the sensor terminal 20 upon receiving it calculates the key intrinsic to the own sensor terminal from the element key 211 of the generation SN (step S451), and acquires all the salts S for calculating the element key of the generation SN^r and the use start time t of the element keys of each of the generations by decryption (step S452).

Then, the retransmission key setting module 203 calculates the element key of the generation SN^r, sets the information as the information {K, t, SN} regarding the currently valid key, and initializes the information {K^q, t^q, SN^q} regarding the next key (step S453). That is, as in step S306 shown in FIG. 4, all the elements of K^q are set as undef, the time acquired by adding (the upper limit value of) the key update interval α to the use start time of the currently valid element key is set as t^q, and the value acquired by adding 1 to SN of the currently valid element key is set as SN^q, respectively. Thereby, the processing is ended.

Figure 6:
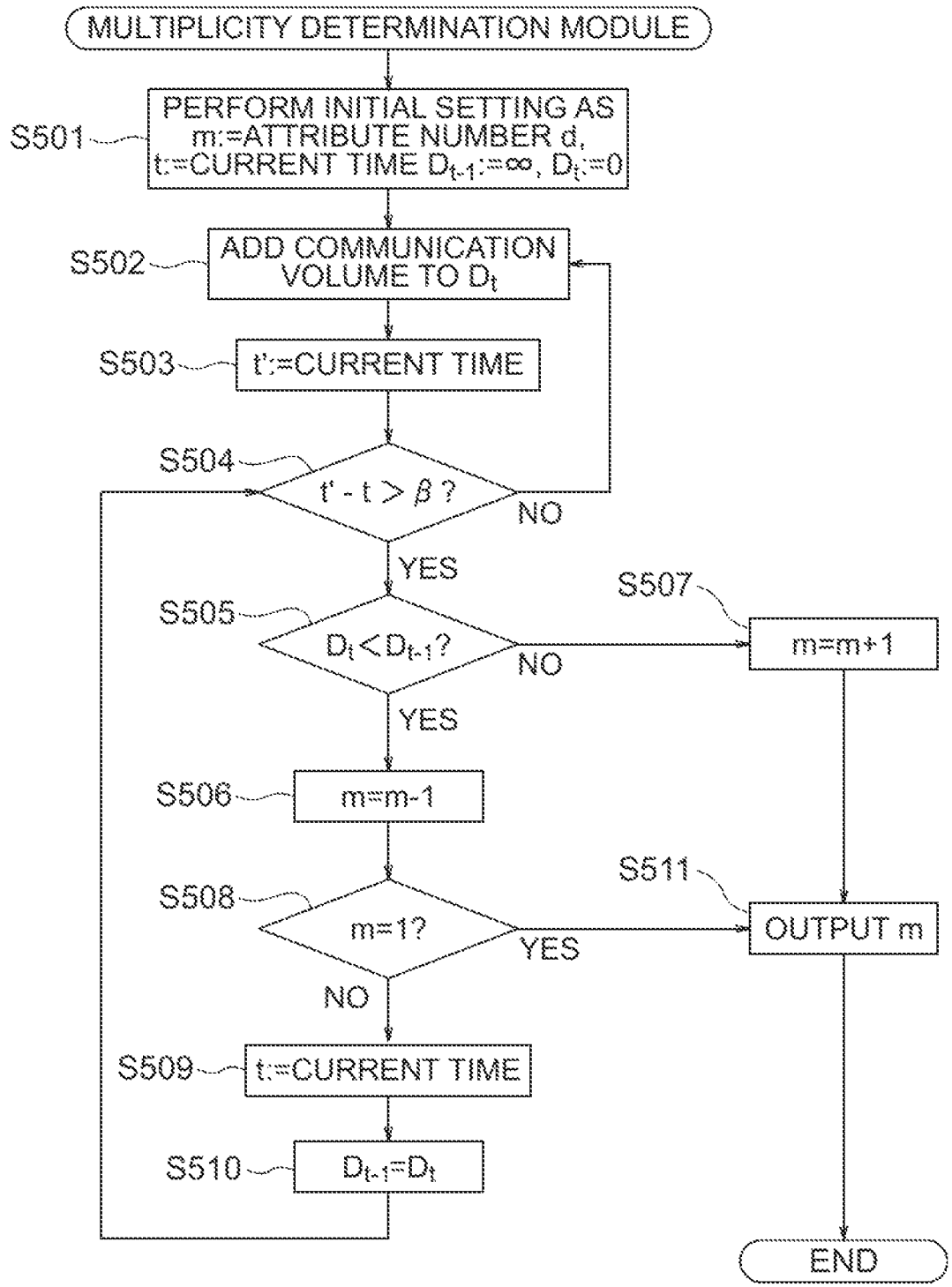
FIG. 6 is a flowchart owing operations executed by a multiplicity determination module in the sensor management server shown in FIG. 1.

FIG. 6 is a flowchart showing the operations executed by the multiplicity determination module 102 in the sensor management server 10 shown in FIG. 1. First, the multiplicity determination module 102 initially sets the multiplicity in, the time t, the sum totals D^t and D_(t−1) of the communication volume of the retransmission processing regarding the key update message delivery processing and NACK (step S501).

More specifically, it is defined as in attribute number d and t=current time, respectively, and the time zone sectioned by a specific length=β defined in advance is referred to as a time window. The current time window is expressed as W_t (current time window) and the time window one before is expressed as W_(t−1). Further, the sum totals of the communication volume in each of the time windows D_t and D_(t−1) are initialized as 0 and ∞ (the maximum value that can be handled with the sensor network 1), respectively.

Subsequently, the multiplicity determination module 102 waits for the occurrence of the key update message delivery processing and the retransmission processing regarding NACK (in the key delivery module 101 and the key retransmission module 103 via the communication volume detection module 104 in the current time window W_t, and adds the communication volume detected via the communication volume detection module 104 in the processing to D_t when such processing occurs (step S502). Then, this time is defined as t' (step S503). In a case where the difference between t' and t is equal to β or less, the steps S502 to 503 are repeated (step S504).

In a case where the difference between t' and t becomes larger than β, D_t and D_(t−1) are compared (step S505). When D_(t−1)≤D_t is satisfied, m is incremented (+1) (step S507), and the value of the multiplicity m is outputted to the key delivery module 101 (step S511). Then the processing is ended. When D_(t−1)>D_t is satisfied, m is decremented (−1) (step S506). Then, it is judged whether or not m=1 is satisfied thereby step S508). When m=1 is satisfied, the value of the multiplicity m is also outputted to the key delivery module 101 (step S511), and the processing is ended.

In a case where m=1 is not satisfied (i.e., m≥2) even when m is decremented (−1), it is again set as t=current time (step S509) and as D_(t−1)=D_t (step S510). Then, the processing is repeated by returning to step S502.

Figure 7:
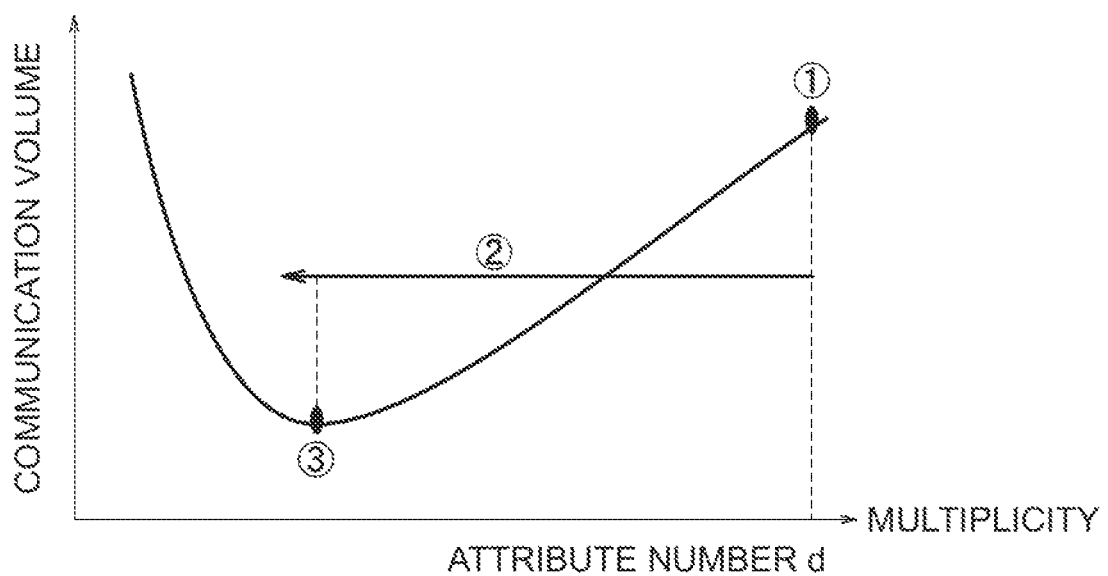
FIG. 7 is an explanatory chart showing changes in the multiplicity no generated by the operation of the multiplicity determination module shown in FIG. 6.

FIG. 7 is an explanatory chart showing changes in the multiplicity m caused by the operations of the multiplicity determination module 102 shown in FIG. 6. At the time of starting the operation, it is set as multiplicity m=attribute number d as the initial setting, i.e., the multiplicity m is set as the initial setting value with a margin, and the key update message is delivered (step S501 of FIG. 6, state marked with 1 in a circle). The multiplicity m is decremented (−1) successively hereinafter while watching the key update message and the communication volume regarding the retransmission thereof (steps S505 to 506 of FIG. 6, state marked with 2 in a circle), and the multiplicity m is incremented (+1) at the point where the communication volume turns to increase from decrease (step S507 of FIG. 6, state marked with 3 in a circle).

Figure 11:
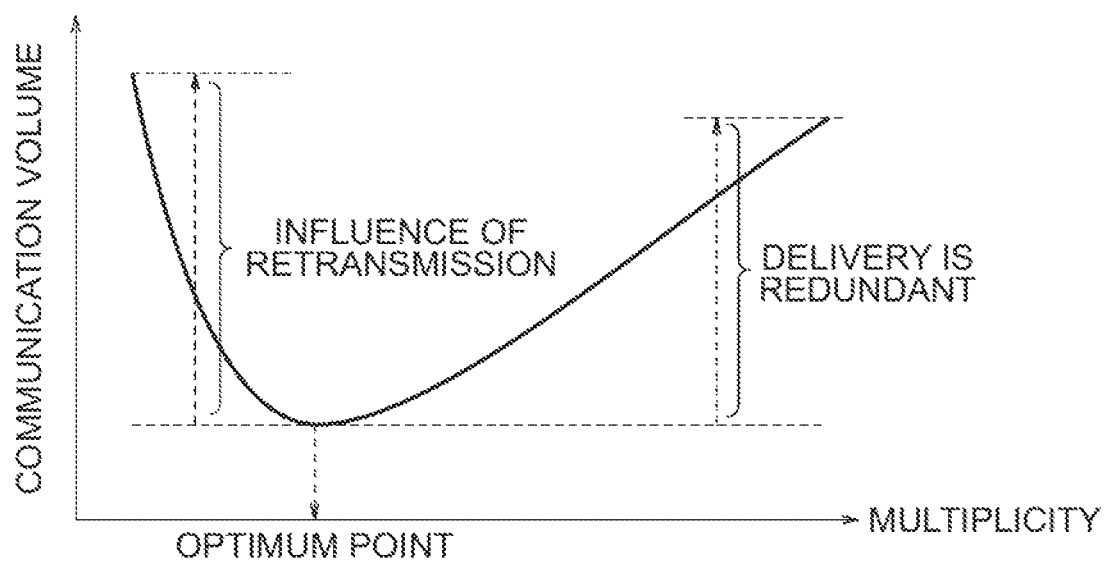
FIG. 11 is an explanatory chart showing an example of the relation between the communication volume and the multiplicity in a case where the technique depicted in Non-Patent Document 2 is applied to the sensor network shown in FIG. 10.

The curve shown in FIG. 7 is the same as the curve of FIG. 11 which shows the relation between the communication volume and the multiplicity, i.e., acquired empirically. As described above, "the communication volume increases whether the multiplicity is too large or too small". Thus, the present invention is designed simply on an assumption that "the multiplicity with which the communication volume becomes the minimum exists in the middle therebetween". In the present invention, the multiplicity m is controlled by the operations shown in FIGS. 6 to 7 such that the communication volume when executing the delivery action of the key update message becomes the minimum.

(Overall Operations of First Embodiment)

Next, overall operations of the above embodiment will be described.

A key updating method according to the embodiment is used in a sensor network in which: a large number of sensor terminals 20 each storing an element key and the sensor management server 10 are connected mutually; the sensor management server transmits the key update message to each of the sensor terminals; and each of the sensor terminals updates the element key according to the received key update message and executes encrypted communication with the sensor management server by utilizing the element key. In the method, the multiplicity determination module of the sensor management server executes initial setting of the numerical value of the multiplicity as the lower limit value of the number of the key update messages transmitted to each of the sensor terminals (FIG. 6, step S501); the key delivery module of the sensor management server transmits the key update message according to the set numerical value of the multiplicity (FIG. 2, steps S101 to 109); the communication volume detection module of the sensor management server detects the communication volume when transmitting the key update message (FIG. 6, step S502); and the multiplicity determination module of the sensor management server specifies the numerical value of the multiplicity for transmitting the key update message next time according to the detected communication volume (FIG. 6, steps S505 to 511).

Note here that each of the above-described steps may be put into programs to be executed by a computer, and each of the steps may be executed by the processor 11 of the sensor management server 10 which directly executes each of the steps. The program may be recorded on a non-transitory recording medium such as a DVD, a CD, a flash memory, or the like. In that case, the program is read out from the recording medium and executed by the computer. Through this operation, the embodiment can provide following effects.

With the embodiment, it is possible to detect the multiplicity having the characteristic of increasing the communication volume whether it is too large or too small as described by referring to FIG. 7 and FIG. 11 via the communication volume detection module 104 and to control the multiplicity such that the communication volume related to transmission of the key update message becomes the minimum thereby. Through minimizing the communication volume, it becomes possible to suppress the power consumption of the sensor terminals 20 and to operate the sensor network 1 for a long time.

Second Embodiment

In addition to the structures of the first embodiment, a sensor network 501 according to a second embodiment of the present invention is so structured that a key delivery module 601 of a sensor management server 510 has a function of transmitting a key update message by excluding a specific sensor terminal designated as an out-of-target terminal for updating the key among each of the sensor terminals.

This structure further makes it possible to selectively invalidate only the element key of the specific sensor terminal 20 in addition to making it possible to acquire the same effects as those of the first embodiment.

This will be described in more details hereinafter.

Figure 8:
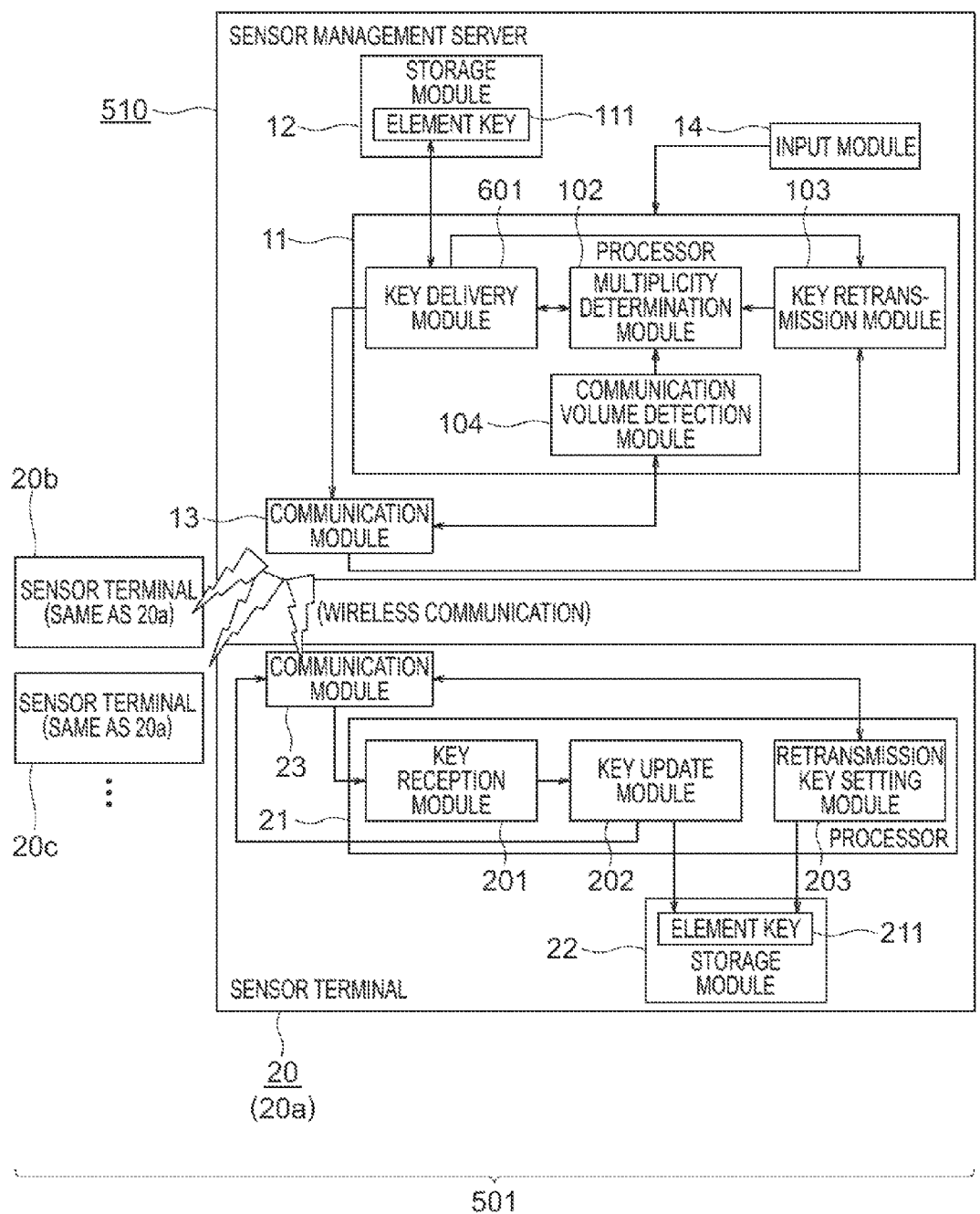
FIG. 8 is an explanatory chart showing the structure of a sensor network according to a second embodiment of the present invention.

FIG. 8 is an explanatory chart showing the structure of the sensor network 501 according to the second embodiment of the present invention. The sensor network 501 is a network in which the sensor management server 10 of the sensor network 1 shown in the first embodiment is replaced with another sensor management server 510. The sensor terminals 20 are the same as those of the first embodiment.

The sensor network 501 is the same as the sensor management server 10 in terms of the structure as hardware. Further, the structure as software operated in the processor 11 is also the same except that the key delivery module 101 is replaced with another key delivery module 601. Thus, only the different points will simply be described herein.

When updating the key, there may be a case where it is required to isolate, from the sensor network 501, a specific sensor terminal 20 corresponding to an identification number n that may have been attacked and to invalidate it. This can be done by updating only the keys of the remaining sensor terminals 20 from which the identification number n is excluded and invalidating the key of the sensor terminal 20 corresponding to the identification number n. The key delivery module 601 is a module acquired by adding a function of invalidating the key of the sensor terminal 20 of identification number n to the key delivery module 101 of the first embodiment.

Figure 9:
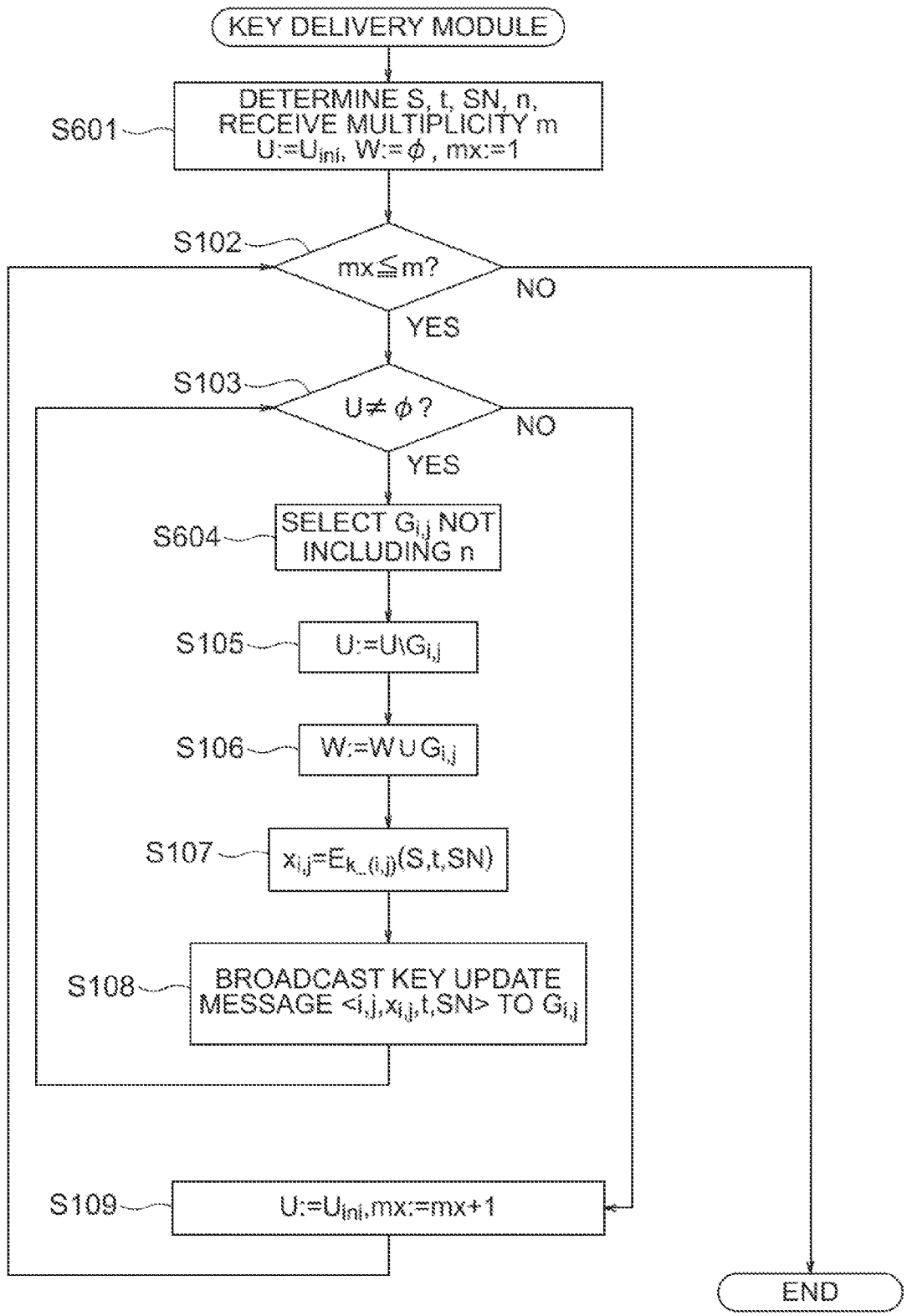
FIG. 9 is a flowchart showing operations executed by a key delivery module in the sensor management server shown in FIG. 8.
Figure 10:
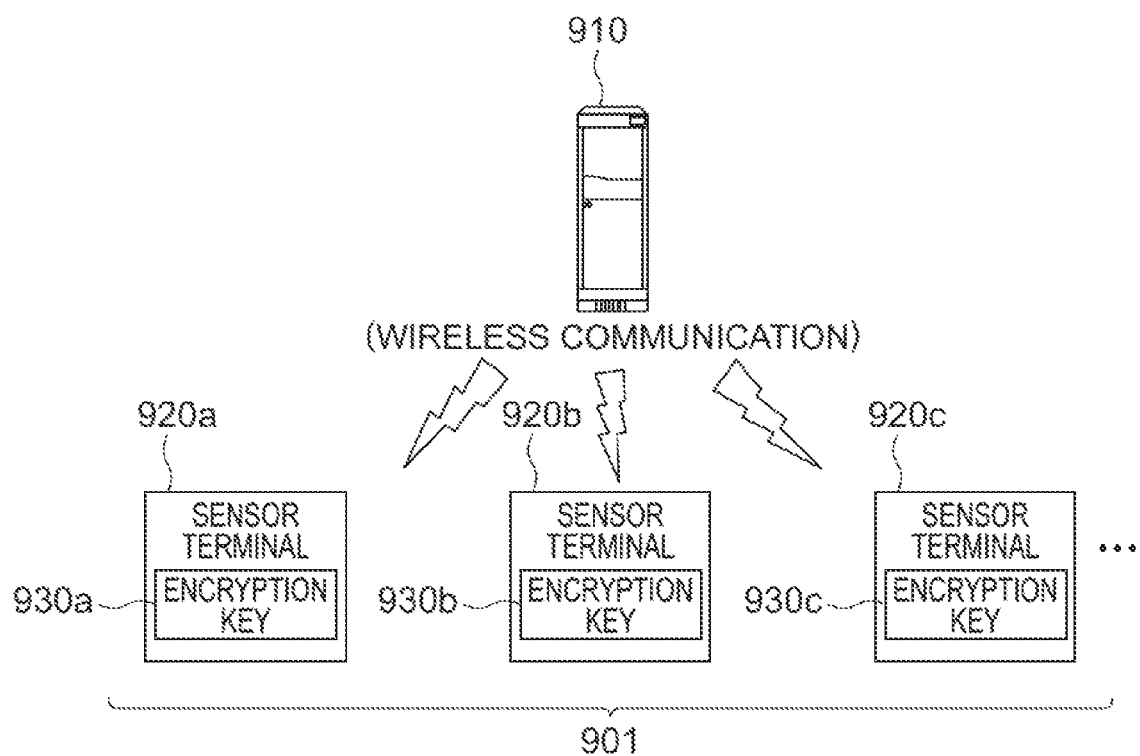
FIG. 10 is an explanatory chart showing the schematic view of structure of a typical sensor network.

FIG. 9 is a flowchart showing the operation of the key delivery module 601 of the sensor management server 510 shown in FIG. 8. The key delivery module 601 first executes initial setting processing prior to the update of the key (step S601). In FIG. 8, the same reference numeral is applied for the same operation as that of the first embodiment shown in FIG. 2 and the explanation thereof is omitted. Only the operations different from those of FIG. 2 are to be described hereinafter.

In step S601, the salt S as a random number, the use start time t of a new element key, the identification number n of the sensor terminal whose key is not the subject of update, and the generation number SN of the new element key are defined, respectively. Further, the numerical value m for determining the multiplicity of the key delivery is inputted from the multiplicity determination module 102. Furthermore, it is also defined that a set U having the sensor terminals as elements=a set Uini of all the sensor terminals whose element keys are updated, a collection W having sets of terminals that share the attribute=φ (an empty set), and variable mx for controlling the multiplicity when delivering the key update message=1, respectively.

Note here that arbitrary time until time acquired by adding α to the use start time of the currently valid element key may be defined, as t. However, in the second embodiment, it is necessary to start the use of the next key as early as possible (necessary to invalidate the key of the sensor terminal n). Thus, it is desirable to set the time close to the current time as much as possible as t. Further, k'_(i, j) shown in Expression 4 described above is stored as a new element key related to the generation number SN with respect to the currently valid element key k. Simultaneously, the salt S as the random number used for generating a new element key, the use start time t, the identification number n of the sensor terminal whose key is not the subject of update, and the information SN showing the generation are stored as well.

Then, the processing of steps S103 to S108 is repeated until mx reaches the multiplicity m (step S102). However, the processing of step S104 is replaced with step S604 described below. First, it is checked whether or not U=φ (an empty set) is satisfied (step S103). When U=φ is not satisfied, a terminal set G_(i, j) having the maximum number of sensor terminals belonging thereto is selected among the terminal sets satisfying Expression 8 below (step S604).

$$G_{i,j} \cap U = \phi, n \in G_{i,j}, G_{i,j} \cap W = \phi \quad \text{(Expression 8)}$$

This step S604 is a condition in which the condition that the sensor terminal n is not included in the terminal set G_(i, j) is further added to the condition (of step S104) shown in Expression 5. The processing thereafter is the same as that of steps S105 to 108 and 109. Through the above-described processing, the same key update message as that of the first embodiment is transmitted to the remaining sensor terminals 20 from which the identification number n is excluded.

While the present invention has been described above by referring to the specific embodiments shown in the drawings, the present invention is not limited only to the embodiments described above. Any other known structures can be employed, as long as the effects of the present invention can be achieved therewith.

The new technical contents of the above-described embodiments can be summarized as follows. While a part of or a whole part of the embodiments can be summarized as follows as the new techniques, the present invention is not necessarily limited only to the followings.

(Supplementary Note 1)

A sensor network including a large number of sensor terminals ea storing an element key and a sensor management server connected mutually, in which the sensor management server transmits a key update message to each of the sensor terminals, and each of the sensor terminals updates the element key according to the received key update message and performs encrypted communication with the sensor management server by utilizing the element key, wherein the sensor management server includes a key delivery module which transmits the key update message with a multiplicity that is a lower limit value of number the key update messages transmitted to each of the sensor terminals.

(Supplementary Note 2)

The sensor network as depicted in Supplementary Note 1, wherein:

the sensor management server includes a communication volume detection module which detects a communication volume when transmitting or retransmitting the key update message, and a multiplicity determination module which specifies a numerical value of the multiplicity that is the lower limit value of the number of the key update messages transmitted to each of the sensor terminals according to the detected communication volume; and the multiplicity determination module specifies the multiplicity with which the communication volume when transmitting or retransmitting the key update message becomes a minimum value, and the key delivery module transmits the key update message with a minimum communication volume that corresponds to the specified multiplicity.

(Supplementary Note 3)

The sensor network as depicted in Supplementary Note 2, wherein the multiplicity determination module of the sensor management server includes a function which sets number of attributes of each of the sensor terminals as an initial value of the multiplicity and, thereafter, successively decreases the multiplicity until the communication volume when transmitting the key update message turns to increase from decrease.

(Supplementary Note 4)

The sensor network as depicted in Supplementary Note 1, wherein each of the sensor terminals includes a key reception module which receives the key update message, and a key update module which updates the element key according to information acquired by decrypting the received key update message.

(Supplementary Note 5)

The sensor network as depicted in Supplementary Note 4, wherein:

each of the sensor terminals includes a retransmission key setting module which requests retransmission of the key update message when the key update message with which the element key can be updated cannot be received;

the sensor management server includes a key retransmission module which transmits information required for updating the element key in response to the retransmission request; and the retransmission key setting module of each of the sensor terminals includes a function which receives the transmitted information required for updating the element key and updates the element key based thereupon.

(Supplementary Note 6)

The sensor network as depicted in Supplementary Note 1, wherein the key delivery module of the sensor management server includes a function which repeats processing for selecting the sensor terminals that correspond to a specific attribute among each of the sensor terminals and transmitting the key update message to those sensor terminals until the multiplicity reaches a numerical value specified by the multiplicity determination module.

(Supplementary Note 7)

The sensor network as depicted in Supplementary Note 6, wherein the key delivery module of the sensor management server includes a function which transmits the key update message by excluding the specific sensor terminal designated as an out-of-target terminal for updating the key among each of the sensor terminals.

(Supplementary Note 8)

A sensor management server connected mutually with a large number of sensor terminals each storing an element key, which transmits a key update message for updating the element key to each of the sensor terminals and performs encrypted communication with each of the sensor terminals by utilizing the element key. The sensor management server includes:

a key delivery module which transmits the key update message to each of the sensor terminals;

a communication volume detection module which detects a communication volume when transmitting or retransmitting the key update message, and a multiplicity determination module which specifies a numerical value of the multiplicity that is a lower limit value of number of the key update messages transmitted to each of the sensor terminals according to the detected communication volume, wherein the multiplicity determination module successively specifies the multiplicity with which the communication volume when transmitting or retransmitting the key update message becomes a minimum value, and the key delivery module successively transmits the key update message according to the specified multiplicity.

(Supplementary Note 9)

A key updating method used in a sensor network including a large number of sensor terminals each storing an element key and a sensor management server connected mutually, in which the sensor management server transmits a key update message to each of the sensor terminals, and each of the sensor terminals updates the element key according to the received key update message and performs encrypted communication with the sensor management server by utilizing the element key, wherein:

a multiplicity determination module of the sensor management server initially sets a numerical value of a multiplicity that is a lower limit value of number of the key update messages transmitted to each of the sensor terminals;

a key delivery module of the sensor management server transmits the key update message according to the set numerical value of the multiplicity;

a communication volume detection module of the sensor management server detects a communication volume when transmitting or retransmitting the key update message; and the multiplicity determination module of the sensor management server specifies the numerical value of the multiplicity when transmitting the key update message next time according to the detected communication volume.

(Supplementary Note 10)

A key updating program used in a sensor network including a lame number of sensor terminals each storing an element key and a sensor management server connected mutually, in which the sensor management server transmits a key update message to each of the sensor terminals, and each of the sensor terminals updates the element key according to the received key update message and performs encrypted communication with the sensor management server by utilizing the element key. The program causes a computer provided to the sensor management server to execute:

a procedure for initially setting a numerical value of a multiplicity that is a lower limit value of number of the key update messages transmitted to each of the sensor terminals;

a procedure for transmitting the key update message according to the set numerical value of the multiplicity;

a procedure for detecting a communication volume when transmitting or retransmitting the key update message; and a procedure for specifying the numerical value of the multiplicity when transmitting the key update message next time according to the detected communication volume.

This Application claims the Priority right based on Japanese Patent Application No. 2012-025916 filed on Feb. 9, 2012 and the disclosure thereof is hereby incorporated by reference in its entirety.

INDUSTRIAL APPLICABILITY

The present invention can be applied to a sensor network. In particular, the present invention can contribute to saving the power, extending the use life, improving the security, and the like of the sensor network.

REFERENCE NUMERALS

1 Sensor network
10, 510 Sensor management server
11, 21 Processor
12, 22 Storage module
13, 23 Communication module
14 Input module
20, 20a, 20b Sensor terminal
101, 601 Key delivery module
102 Multiplicity determination module
103 Key retransmission module
104 Communication volume detection module 111, 211 Element key
201 Key reception module
202 Key update module
203 Retransmission key setting module

The invention claimed is:

1. A sensor network comprising:
plural sensor terminals operatively connected to the sensor management server, each said sensor terminal storing an element key; and
a sensor management server operatively connected to each of the sensor terminals,
wherein the sensor management server transmits a key update message to each of the sensor terminals, and each of the sensor terminals i) updates the element key according to the received key update message, and ii) performs encrypted communication with the sensor management server by utilizing the element key,
wherein the sensor management server comprises:
i) a key delivery module which transmits the key update message, a multiplicity of times, from the sensor management server to each of the sensor terminals, the multiplicity being defined as a lower limit value of a number of the key update messages to be transmitted to each of the sensor terminals,
ii) a communication volume detection module which detects a communication volume when transmitting the key update message from the key delivery module to each of the sensor terminals, and
iii) a multiplicity determination module which specifies, based on the detected communication volume, a numerical value of the multiplicity to thereby specify the number of the key update messages that the key delivery module transmits to each of the sensor terminals,
wherein the multiplicity determination module specifies the numerical value of the multiplicity corresponding to where the communication volume when transmitting the key update message becomes a minimum value, and the key delivery module transmits the key update message with a minimum communication volume that corresponds to the numerical value of the multiplicity specified by the multiplicity determination module.

2. The sensor network as claimed in claim 1, wherein the multiplicity determination module includes a function which sets number of attributes of each of the sensor terminals as an initial value of the multiplicity and, thereafter, successively decreases the multiplicity until the communication volume when transmitting the key update message turns to increase from decrease.

3. The sensor network as claimed in claim 1, wherein each of the sensor terminals comprises a key reception module which receives the key update message, and a key update module which updates the element key according to information acquired by decrypting the received key update message.

4. The sensor network as claimed in claim 3, wherein:
each of the sensor terminals comprises a retransmission key setting module which requests retransmission of the key update message when the key update message with which the element key can be updated cannot be received;
the sensor management server comprises a key retransmission module which transmits information required for updating the element key in response to the retransmission request; and
the retransmission key setting module of each of the sensor terminals includes a function which receives the transmitted information required for updating the element key and updates the element key based thereupon.

5. The sensor network as claimed in claim 1, wherein the key delivery module of the sensor management server includes a function which repeats processing for selecting the sensor terminals that correspond to a specific attribute among each of the sensor terminals and transmitting the key update message to those sensor terminals until the multiplicity reaches a numerical value specified by the multiplicity determination module.

6. The sensor network as claimed in claim 5, wherein the key delivery module of the sensor management server includes a function which transmits the key update message by excluding the specific sensor terminal designated as an out-of-target terminal for updating the key among each of the sensor terminals.

7. A sensor management server connected mutually with a large number of sensor terminals each storing an element key, wherein the sensor management server transmits a key update message to each of the sensor terminals for i) the sensor terminals updating the element key to each of the sensor terminals and ii) performing encrypted communication with each of the sensor terminals by utilizing the element key, the sensor management server comprising:
a key delivery module which transmits the key update message, a multiplicity of times, to each of the sensor terminals, the multiplicity being defined as a lower limit value of a number of the key update messages to be transmitted to each of the sensor terminals;
a communication volume detection module which detects a communication volume when transmitting or retransmitting the key update message from the key delivery module to each of the sensor terminals, and
a multiplicity determination module which specifies, based on the detected communication volume, a numerical value of the multiplicity to thereby specify the number of the key update messages that the key delivery module transmits to each of the sensor terminals,
wherein the multiplicity determination module successively specifies the multiplicity with which the detected communication volume when transmitting or retransmitting the key update message becomes a minimum value, and the key delivery module successively transmits the key update message according to the specified multiplicity such that the communication volume when transmitting or retransmitting the key update message is the minimum value.

8. A key updating method used in a sensor network comprising a large number of sensor terminals each storing an element key and a sensor management server connected mutually with each of the sensor terminals, the method comprising:
the sensor management server transmitting a key update message, a multiplicity of times, to each of the sensor terminals, the multiplicity being defined as a lower limit value of a number of the key update messages to be transmitted to each of the sensor terminals; and
each of the sensor terminals i) updating the element key according to the received key update message and ii) performing encrypted communication with the sensor management server by utilizing the element key, wherein:
a multiplicity determination module of the sensor management server initially sets an initial numerical value of the multiplicity to set an initial number of the key update messages to be transmitted from the sensor management server to each of the sensor terminals;

a key delivery module of the sensor management server transmits the key update message to each of the sensor terminals according to the set initial numerical value of the multiplicity;

a communication volume detection module of the sensor management server detects a communication volume when transmitting or retransmitting the key update message from the key delivery module to each of the sensor terminals; and the multiplicity determination module of the sensor management server specifies an updated numerical value of the multiplicity when transmitting the key update message plural next times according to the detected communication volume wherein, the multiplicity determination module determines a further numerical value of the multiplicity corresponding to where the communication volume, when transmitting the key update message the number of times corresponding to the further numerical value of the multiplicity, becomes a minimum value, and the key delivery module transmits the key update message with a minimum communication volume that corresponds to the determined further numerical value of the multiplicity specified by the multiplicity determination module.

9. A non-transitory computer readable recording medium storing a key updating program used in a sensor network comprising a large number of sensor terminals each storing an element key and a sensor management server connected mutually with each of the sensor terminals, in which the sensor management server transmits a key update message, a multiplicity of times, to each of the sensor terminals, the multiplicity being defined as a lower limit value of a number of the key update messages to be transmitted to each of the sensor terminals, and each of the sensor terminals updates the element key according to the received key update message and ii) performs encrypted communication with the sensor management server by utilizing the element key, the program causing a computer provided to the sensor management server to execute:

a procedure for initially setting an initial numerical value of the multiplicity to set an initial number of the key update messages transmitted from the sensor management server to each of the sensor terminals;

a procedure for transmitting the key update message according to the set initial numerical value of the multiplicity;

a procedure for detecting a communication volume when transmitting or retransmitting the key update message, from the the sensor management server to each of the sensor terminals; and a procedure for specifying an updated numerical value of the multiplicity when transmitting the key update message a next time according to the detected communication volume wherein, the multiplicity determination module determines the updated numerical value of the multiplicity corresponding to where the communication volume, when transmitting the key update message, becomes a minimum value, and the key update message is transmitted with a minimum communication volume that corresponds to the determined updated numerical value of the multiplicity specified by the specifying step.

10. A sensor network comprising a large number of sensor terminals each storing an element key and a sensor management server connected mutually with each of the sensor terminals, in which the sensor management server transmits, a multiplicity of times, a key update message to each of the sensor terminals, the multiplicity being defined as a lower limit value of a number of the key update messages to be transmitted to each of the sensor terminals, and each of the sensor terminals i) updates the element key according to the received key update message and ii) performs encrypted communication with the sensor management server by utilizing the element key, wherein the sensor management server comprises:
i) a storage unit that stores data,
ii) a communication unit that, in operation, transmits the key update message the multiplicity of times to each of the sensor terminals, and
iii) a processor connected to each of the storage unit and the communication unit, the processor functioning to provide
a) a key delivery module that, via the communication unit, transmits the key update message to each of the sensor terminals according to a set numerical value of the multiplicity;
b) a communication volume detection module that detects a communication volume when transmitting or retransmitting the key update message to each of the sensor terminals according to the set numerical value of the multiplicity; and
c) a multiplicity determination module that sets an initial numerical value of the multiplicity to set an initial number of the key update messages to be transmitted to each of the sensor terminals, and then successively specifies updated numerical values of the multiplicity according to respective updated detected communication volumes, wherein the multiplicity determination module determines a further numerical value of the multiplicity corresponding to where the communication volume, when transmitting the key update message based on the updated numerical value of the multiplicity, becomes a minimum value, and the key delivery module transmits the key update message with a minimum communication volume that corresponds to the determined further numerical value of the multiplicity specified by the multiplicity determination module.

11. A sensor management server comprising an operative connection to each of plural sensor terminals, each sensor terminal storing an element key, wherein the sensor management server transmits, a multiplicity of times, a key update message for updating the element key to each of the sensor terminals and performs encrypted communication with each of the sensor terminals by utilizing the element key, wherein the multiplicity is defined as a lower limit value of a number of the key update messages to be transmitted to each of the sensor terminals, wherein the sensor management server comprises:
i) a storage unit that stores data,
ii) a communication unit that, in operation, transmits the key update message the multiplicity of times to each of the sensor terminals, and
iii) a processor connected to each of the storage unit and the communication unit, the processor functioning to provide
a) a key delivery module that, via the communication unit, transmits the key update message to each of the sensor terminals a number of times according to a set numerical value of the multiplicity;
b) a communication volume detection module that detects a communication volume when transmitting or retransmitting the key update message to each of the sensor terminals the number of times according to the set numerical value of the multiplicity; and c) a multiplicity determination module that successively specifies the numerical value of the multiplicity to successively set the number of times the key update messages are transmitted to each of the sensor terminals, wherein the multiplicity determination module determines successively numerical values of the multiplicity so that the communication volume becomes a minimum value, and so that the key delivery module is adjusted to transmit the key update message with a minimum communication volume that corresponds to an optimum numerical value of the multiplicity specified by the multiplicity determination module that corresponds with the minimum value of the communication volume.

* * * * *